United States Patent Office 3,236,881
Patented Feb. 22, 1966

3,236,881
ORGANIC AMMONIUM SALTS OF VINYL SULFONIC ACID
Harry Distler, Werner Mueller, and Heinz Ulrich Werner, Ludwigshafen (Rhine), Germany, assignors to Badische Anilin- & Soda-Fabrik Aktiengesellschaft, Ludwigshafen (Rhine), Germany
No Drawing. Filed Jan. 6, 1961, Ser. No. 80,978
Claims priority, application Germany, Jan. 9, 1960,
B 56,187
1 Claim. (Cl. 260—501)

This invention relates to new salts of vinyl sulfonic acid.

Vinyl sulfonic acid has been known for a long time but it has only recently acquired industrial importance. Hitherto only inorganic salts of vinyl sulfonic acid have been described.

It is the main object of the present invention to provide new salts of vinyl sulfonic acid.

In accordance with the invention, these salts are organic ammonium salts of viny sulfonic acid. Broadly speaking, organic ammonium salts of vinyl sulfonic acid are salts which are derived from organic nitrogen bases. These nitrogen bases may be primary, secondary or tertiary amines or quaternary ammonium bases.

More specifically, the salts in question have the general formula:

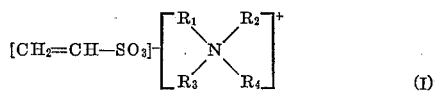

in which $R_1$ denotes a monovalent hydrocarbon radical which may be substituted by halogen, especially by chlorine, by hydroxy groups, especially by alcoholic hydroxyl groups, and/or may contain ether bridges, and in which the alcoholic hydroxyl groups may be substituted by saturated aliphatic acyl radicals with 1 to 4 carbon atoms; $R_2$, $R_3$ and $R_4$ may have the same meaning as $R_1$ but may also stand for hydrogen; $R_4$ may also be a monovalent hydrocarbon radical which bears a group of the formula:

$R_1$ and $R_2$ may also denote possibly alkyl-substituted polymethylene groups which connect the nitrogen atom in Formula I with a group of the formula:

In the Formulae II and III, $R_5$, $R_6$ and $R_7$ stand for hydrogen, hydrocarbon radicals with 1 to 4 carbon atoms or hydroxyalkyl radicals with 1 to 4 carbon atoms, and $A^{(-)}$ denotes an anion, preferably that of vinyl sulfonic acid. When $R_4$ or $R_1$ and $R_2$ bear the two last-mentioned groupings, the other substituents of the nitrogen atom in Formula I have the same meaning as $R_5$, $R_6$ and $R_7$. $R_2$ and $R_3$ may also form, together with the nitrogen atom which they substitute, a heterocyclic ring with 5 to 7 ring members. Finally, $R_1$, $R_2$ and $R_3$ may also be components of a heterocyclic ring with 5 or 6 ring members which contains as a ring member the nitrogen atom which is substituted by $R_1$, $R_2$ and $R_3$. In this case, the nitrogen atom bears a C–N double linkage and $R_4$ preferably denotes hydrogen or an alkyl radical with 1 to 4 carbon atoms.

Among the monovalent hydrocarbon radicals there are included especially alkyl radicals with 1 to 20 carbon atoms, alkenyl radicals with 2 to 5 carbon atoms, aryl radicals with 6 to 10 carbon atoms, and also cycloalkyl radicals with 5 to 12 carbon atoms, especially 5 to 8 carbon atoms, and finally aralkyl radicals with 7 to 12 carbon atoms. The aryl and cycloalkyl radicals as well as the aryl radicals in the aralkyl radicals may also be substituted by one or two lower alkoxy or alkyl radicals with 1 to 4 carbon atoms. Further alkyl radicals are those which contain 1 to 3 carbon atoms and are substituted by a hydroxyl group, or which contain 2 to 10 carbon atoms, are substituted by 1 or 2 hydroxyl groups and contain 1 to 4 ether bridges.

In the preferred compounds in which $R_4$ denotes a hydrocarbon radical connecting a group of the Formula II with the nitrogen atom of general Formula I, this hydrocarbon radical is a polymethylene radical with 2 to 8 carbon atoms or consists of two phenylene radicals combined by way of a saturated aliphatic hydrocarbon bridge with 1 to 3 carbon atoms. These phenylene radicals may in turn be substituted by one or two alkyl groups with 1 to 4 carbon atoms.

Among the compounds of the general Formula I in which $R_3$ and $R_4$ denote polymethylene radicals which may be substituted and which form a heterocyclic ring with two nitrogen atoms, we prefer those in which the polymethylene radicals are ethylene radicals or ethylene radicals substituted by methyl groups.

Of the compounds in which $R_2$ and $R_3$, together with the nitrogen atom on which they are substituents, form a heterocyclic 5- to 7-membered ring we prefer especially those in which the cation contains a heterocyclic 5-membered ring which consists of carbon atoms and one or two nitrogen atoms or a nitrogen atom and a sulfur or oxygen atom. They may however also form a 6-membered ring having, besides carbon atoms, one or two nitrogen atoms or a nitrogen atom and a sulfur or oxygen atom. Heterocyclic 7-membered rings containing 6 carbon atoms and 1 nitrogen atom may also be mentioned. Besides the heterocyclic rings which are unsubstituted at the atoms forming a heterocyclic ring with the nitrogen atom of Formula I we prefer those which bear an alkyl radical with 1 to 4 carbon atoms.

Of the compounds in which $R_1$, $R_2$ and $R_3$ together with the nitrogen of which they are substituents form a heterocyclic 5- or 6-membered ring, those are especially preferred which contain a pyridine ring or a pyridine ring substituted by one or two alkyl radicals with 1 to 4 carbon atoms.

The production of the new type of organic ammonium salts of vinyl sulfonic acid may be carried out in various ways. For example, the nitrogen base may be neutralized with the stoichiometric amount of vinyl sulfonic acid. This is preferably done in a solvent, for example in water. An amine may also be allowed to react with a vinyl sulfonic acid ester, the hydrocarbon radical of the alcoholic component of the ester being transferred to the nitrogen. The said two methods of production are illustrated in detail in the examples.

The new type of organic ammonium salts of vinyl sulfonic acid are suitable for the production of aqueous polymer dispersions free from emulsifier.

It is known that anion-active, cation-active or non-ionic emulsifiers or protective colloids or suitable mixtures of the said surface-active substances may be used for the production of emulsion polymers. The choice of the emulsifier is of decisive influence on the course of the polymerization and the properties of the plastic emulsion. For example, the size of the dispersed polymer particles is determined by the nature and amount of the emulsifier. The mechanical and thermal stability of dispersions and also their behavior to electrolyte solutions or their tendency to foam depend largely on the nature of the emulsifier. The properties of films and coatings prepared from such plastic dispersions are also determined by the nature of the emulsifier. For example, films which have been prepared from polymer emulsions which contain a large amount of a surface-active substance have the property of absorbing relatively large amounts of water, the influence of the hydrophobic properties of the dispersed polymer on the imbibition of the films or coatings often being very slight. Frequently, the strong foaming of polymer dispersions prepared with emulsifier of the said kind is undesirable in the case of mechanical movement, because it disturbs or renders impossible, for example, the working up of dispersions with rotating application rollers in the coating of paper webs.

The polymer dispersions prepared by the use of the new organic ammonium salts of vinyl sulfonic acid are characterized by the fact that upon shaking they form foam only to a very slight degree. This is of great importance whenever the dispersions are subjected to strong mechanical agitation. The water imbibition of the polymers is also less than with polymers which have been prepared with the aid of emulsifier and/or protective colloids. When using the new salts in emulsifier-free polymerization, it is not necessary to start from the salts in substance. The same result is achieved by using solutions of salts which have been obtained by the action of vinyl sulfonic acid esters on an amine in a lower alcohol soluble in water or by neutralization of an amine or a quaternary ammonium base, especially in aqueous medium.

Of the compounds of general Formula I we prefer the quaternary ammonium salts, i.e., those which have no hydrogen atom at the nitrogen. These yield the best results in emulsifier-free polymerization. The salts which are derived from primary, secondary or tertiary amines, and thus have organic nature are however considerably more useful for this purpose than inorganic salts or vinyl sulfonic acid. Among the quaternary ammonium salts those are preferred, by reason of their especially valuable properties, in which the radicals $R_1$, $R_2$ and $R_3$ denote lower alkyl radicals with 1 to 4 carbon atoms, while $R_4$ stands for a monocyclic hydrocarbon radical with 5 to 12 carbon atoms or for a benzyl radical. Those organic ammonium salts are also very suitable in which the radical $R_1$ stands for a lower alkyl radical with 1 to 4 carbon atoms, $R_2$, $R_3$ and $R_4$ have the same meaning or stand for a —$(CH_2—CH_2—O)_n$—$CH_2$—$CH_2OH$ radical, in which $n$ stands for zero or a whole number from 1 to 3 inclusive; in each —$CH_2$—$CH_2$— unit of the radical, a hydrogen atom may be replaced by a methyl radical.

The invention is illustrated by, but not limited to, the following examples.

*Example 1*

A mixture of 14.5 parts of 8-hydroxyquinoline and 12.2 parts of vinyl sulfonic acid methyl ester is heated at 80° to 90° C. for 5 hours. 26 parts of a yellow crystalline quaternary ammonium compound (N-methyl-8-hydroxyquinolinium vinyl sulfonate) of the melting point 147° C. which dissolves readily in water are obtained.

*Example 2*

A mixture of 12.1 parts of dimethylaniline and 13.6 parts of vinyl sulfonic acid ethyl ester is heated at 100° C. for 1½ hours. 15 parts of a crystalline quaternary ammonium salt (ethyl-dimethyl-anilinium vinyl sulfonate) are obtained; it is strongly hygroscopic and readily soluble in water.

*Example 3*

A mixture of 12.7 parts of 4,4'-dimethylaminodiphenylmethane and 13.6 parts of vinyl sulfonic acid ethyl ester is heated at 100° C. for two hours. 26 parts of a crystalline quaternary ammonium salt of the formula:

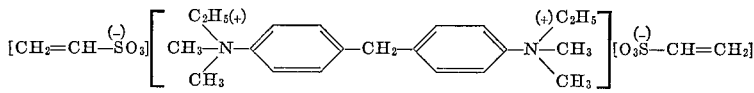

are obtained; it has the melting point 149° C. and is clearly soluble in water.

*Example 4*

A mixture of 12.7 parts of 4,4'-dimethylaminodiphenylmethane and 16.4 parts of vinyl sulfonic acid butyl ester is heated at 110° C. for an hour. 27 parts of a crystalline strongly hygroscopic quaternary ammonium salt are obtained which is clearly soluble in water. Its formula is:

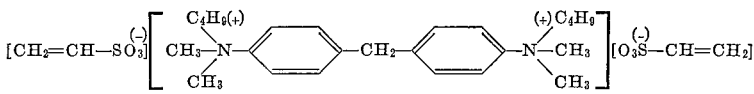

*Example 5*

635 parts of dimethylcyclohexylamine are added within 15 minutes at room temperature while cooling to 610 parts of vinyl sulfonic acid methyl ester in 1500 parts of acetone. The reaction mixture is kept at room temperature for about 5 hours and then heated for an hour under reflux. 1055 parts of trimethylcyclohexyl-ammonium-vinyl sulfonate are obtained in the form of colorless crystals which melt at 185° C.

*Analysis.*—N calculated: 5.6%. Found: 5.6%. Hydrogenation iodine number, calculated: 102. Found: 109.

*Example 6*

128 parts of dimethyl palm kernel fatty amine (mean molecular weight 227) are allowed to flow in about 5 minutes into 61 parts of vinyl sulfonic acid methyl ester in 500 parts of acetone while stirring. The temperature rises until boiling under reflux takes place. The mixture is stirred for an hour at this temperature. Crystallization takes place on cooling. 147 parts of trimethyl palm kernel fatty-ammonium vinyl sulfonate of the melting point 205° C. are obtained.

*Analysis.*—S calculated: 9.17%. Found: 9.3%.

*Example 7*

61 parts of vinyl sulfonic acid methyl ester are allowed to flow into 40 parts of pyridine in 250 parts of acetone. The whole is boiled for 3 hours under reflux and, after cooling, 93 parts of N-methyl-pyridinium vinyl sulfonate of the melting point 93° C. are obtained.

*Example 8*

61 parts of vinyl sulfonic acid methyl ester are gradually added to 65 parts of quinoline in 250 parts of acetone and the further procedure of Example 7 followed. 100 parts of N-methylquinolinium vinyl sulfonate of the melting point 122° C. are obtained.

*Example 9*

61 parts of vinyl sulfonic acid methyl ester are dripped gradually into 47 parts of N-vinylimidazole in 250 parts of acetone. The further procedure of Example 7 is followed and 88 parts of N-methyl-vinylimidazolium vinyl sulfonate of the melting point 63° C. are obtained.

*Example 10*

61 parts of vinyl sulfonic acid methyl ester are allowed to flow slowly into 47 parts of γ-picoline in 250 parts of acetone. The further procedure of Example 7 is followed and 82 parts of N-methyl-γ-picolinium vinyl sulfonate of the melting point 55° C. are obtained which is very hygroscopic.

*Example 11*

61 parts of vinyl sulfonic acid methyl ester are slowly added to 72 parts of quinaldine in 250 parts of acetone. The further procedure of Example 7 is followed and 38 parts of N-methyl-quinaldinium vinyl sulfonate of the melting point 137° C. are obtained.

*Example 12*

40 parts of pyridine are allowed to flow at 25° to 30° C. into 128 parts of 42% aqueous vinyl sulfonic acid. The water is then removed in the vacuum of a water jet pump at a bath temperature of up to 100° C. Upon cooling, 93.5 parts of pyridinium vinyl sulfonate crystallize. After washing with acetone, a sample shows a melting point of 92° to 94° C. The colorless crystals are very hygroscopic.

The following compounds are obtained in an analogous manner:

(a) 88 parts of crotyl-ammonium vinyl sulfonate from (b) 35 parts of crotylamine and (c) 128 parts of vinyl sulfonic acid 42%;

(a) 120 parts of 4-isopropylanilinium vinyl sulfonate from (b) 67 parts of 4-isopropylaniline and (c) 128 parts of vinyl sulfonic acid 42%;

(a) 124 parts of α-naphthylammonium vinyl sulfonate from (b) 71 parts of α-naphthylamine and (c) 128 parts of vinyl sulfonic acid 42%;

(a) 140 parts of dimethyl-4-methoxyphenylammonium vinyl sulfonate from (b) 89 parts of 4-methoxy-diethyl-aniline and (c) 128 parts of vinyl sulfonic acid 42%;

(a) 90 parts of 2-hydroxy-isopropylammonium vinyl sulfonate from (b) 37 parts of 1-hydroxy-2-aminopropane and (c) 128 parts of vinyl sulfonic acid 42%;

(a) 120 parts of

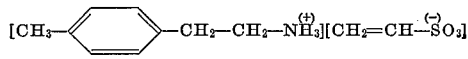

from (b) 67 parts of

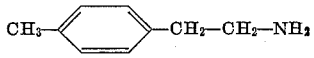

and (c) 128 parts of vinyl sulfonic acid 42%;

(a) 240 parts of

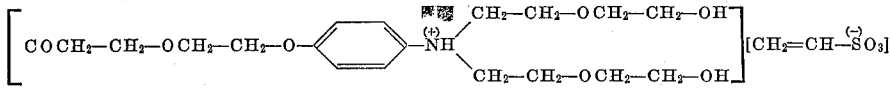

from (b) 186 parts of

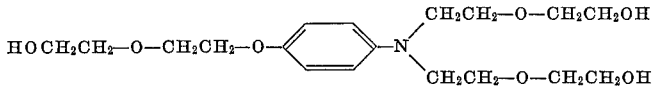

and (c) 128 parts of vinyl sulfonic acid 42%;

(a) 150 parts of

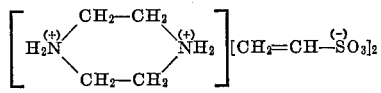

from (b) 43 parts of piperazine and (c) 256 parts of vinyl sulfonic acid 42%;

(a) 176 parts of

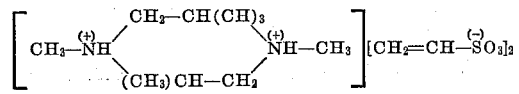

from (b) 71 parts of

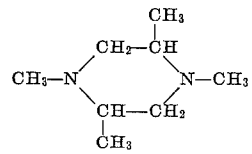

and (c) 256 parts of vinyl sulfonic acid 42%;

(a) 151 parts of

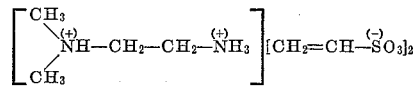

from (b) 44 parts of

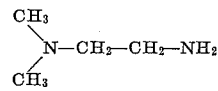

and (c) 256 parts of vinyl sulfonic acid 42%;

(a) 180 parts of

from (b) 72 parts of $NH_2$—$(CH_2)_8$—$NH_2$ and (c) 256 parts of vinyl sulfonic acid 42%;

(a) 247 parts of

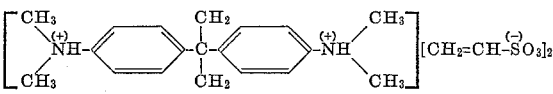

from (b) 141 parts of

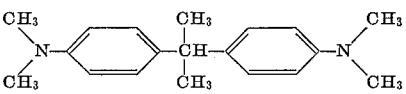

and (c) 256 parts of vinyl sulfonic acid 42%;

(a) 93 parts of N-methylpyrrolidinium vinyl sulfonate from (b) 40 parts of N-methylpyrrole and (c) 128 parts of vinyl sulfonic acid 42%;

(a) 44 parts of pyrazolinium vinyl sulfonate from (b) 34 parts of pyrazole and (c) 128 parts of vinyl sulfonic acid 42%;

(a) 95 parts of thiazolinium vinyl sulfonate from (b) 42 parts of thiazole and (c) 128 parts of vinyl sulfonic acid 42%;

(a) 87 parts of oxazolinium vinyl sulfonate from (b) 34 parts of oxazole and (c) 128 parts of vinyl sulfonic acid 42%;

(a) 97 parts of morpholinium vinyl sulfonate from (b) 43 parts of morpholine and (c) 128 parts of vinyl sulfonic acid 42%;

(a) 104 parts of N-methylmorpholinium vinyl sulfonate from (b) 50 parts of M-methylmorpholine and (c) 128 parts of vinyl sulfonic acid 42%;

(a) 104 parts of thiomorpholinium vinyl sulfonate from (b) 51 parts of thiomorpholine and (c) 128 parts of vinyl sulfonic acid 42%;

(a) 103 parts of hexamethylene-imonium vinyl sulfonate from (b) 49 parts of hexamethylene imine and (c) 128 parts of vinyl sulfonic acid 42%;

(a) 136 parts of diphenylammonium vinyl sulfonate from (b) 84 parts of diphenylamine and (c) 128 parts of vinyl sulfonic acid 42%;

(a) 125 parts of triethanol-ammonium vinyl sulfonate from (b) 74 parts of triethanolamine and (c) 128 parts of vinyl sulfonic acid 42%;

(a) 96 parts of N-methylpyrrolidinium vinyl sulfonate from (b) 42 parts of N-methylpyrrolidine and (c) 128 parts of vinyl sulfonic acid 42%;

(a) 150 parts of β-(p-tert.-butyloxy)-ethylammonium vinyl sulfonate from (b) 97 parts of β-(p-tert.-butyloxy)-ethylamine and (c) 128 parts of vinyl sulfonic acid 42%;

(a) 116 parts of 4-methoxy-cyclohexylammonium vinyl sulfonate from (b) 64 parts of 4-methoxy-cyclohexylamine and (c) 128 parts of vinyl sulfonic acid 42%;

(a) 121 parts of N,N-dimethyl-o-toluidinium vinyl sulfonate from (b) 68 parts of N,N-dimethyl-o-toluidine and (c) 128 parts of vinyl sulfonic acid 42%;

(a) 116 parts of p-methoxy-anilinium vinyl sulfonate from (b) 62 parts of p-methoxy-aniline and (c) 128 parts of vinyl sulfonic acid 42%;

(a) 98 parts of

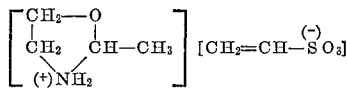

from (b) 44 parts of

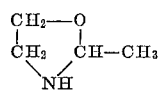

and (c) 128 parts of vinyl sulfonic acid 42%.

*Example 13*

17 parts of a 42% aqueous vinyl sulfonic acid are added gradually at 25° to 30° C. to 32 parts of an about 35% methanol solution of trimethyl-benzyl-ammonium hydroxide. After neutralization has been completed, the solvent is removed in vacuo at the waterbath temperature. The crystalline colorless trimethyl-benzyl-ammonium vinyl sulfonate obtained is digested with acetone, filtered off by suction and dried.

*Example 14*

73 parts of diethylamine are allowed to drip at 20° to 25° C. into 256 parts of a 42% aqueous vinyl sulfonic acid. The diethyl-ammonium vinyl sulfonate is dried as in Example 13 and is a colorless, thick oily liquid which crystallizes upon cooling.

*Example 15*

90 parts of 50% aqueous monoethylamine are allowed to flow into 256 parts of aqueous vinyl sulfonic acid at 20° to 25° C. The whole is stirred for half an hour and the solvent removed in an oil pump vacuum at a bath temperature up to 100° C. The ethyl-ammonium vinyl sulfonate is a colorless viscous liquid.

*Example 16*

61 parts of vinyl sulfonic acid methyl ester are allowed to flow into 58 parts of diethyl-ethanolamine in 250 parts of acetone in about 5 minutes. The whole is allowed to boil under reflux for 3 hours, two layers being formed. The solvent is removed in vacuo and 113 parts of methyl-bis-(β-hydroxyethyl)-ammonium vinyl sulfonate remain in the form of a pale yellow viscous oil.

*Example 17*

6 parts of vinyl sulfonic acid methyl ester are allowed to flow into 10 parts of 2-dimethylamino-cyclo-octyl acetate in 10 parts of acetone at room temperature. The whole is heated under reflux for 2 hours. After cooling, 8 parts of 2-acetoxycyclo-octyl-trimethyl-ammonium vinyl sulfonate of the melting point 148° C. are obtained.

*Example 18*

544 parts of dimethylaniline are allowed to flow at 0° C. into 549 parts of vinyl sulfonic acid methyl ester in 2000 parts of methanol. The temperature is allowed to rise to 25° C. and the whole stirred for 4 hours. Then the solvent is distilled off until a temperature of 125° C. is reached in the flask. Last traces of solvent are removed in vacuo. The remaining melt of trimethyl-phenyl-ammonium vinyl sulfonate is introduced into 1500 parts of acetone, the solvent thus boiling. After cooling, the crystal pulp is filtered off by suction. 1025 parts of a crystallizate are obtained which melts at 122° to 125° C.

The following compounds (a) are obtained in the same way from the compounds (b) and (c)

(a) 130 parts of dimethyl-propyl-4-methylcyclohexyl-ammonium vinyl sulfonate from (b) 70 parts of 4-dimethylaminomethylcyclohexane and (c) 75 parts of vinyl sulfonic acid propyl ester;

(a) 159 parts of dimethyl-butyl-cyclododecyl-ammonium vinyl sulfonate from (b) 105 parts of dimethylaminocyclododecane and (c) 82 parts of vinyl sulfonic acid butyl ester;

(a) 133 parts of dimethyl-ethyl-cyclo-octyl-ammonium vinyl sulfonate from (b) 77 parts of dimethylamino-cyclooctane and (c) 68 parts of vinyl sulfonic acid ethyl ester;

(a) 138 parts of triethyl-4-methylphenyl-ammonium vinyl sulfonate from (b) 81 parts of 4-diethylaminotoluene and (c) 68 parts of vinyl sulfonic acid ethyl ester;

(a) 118 parts of methyl-tri-(2-hydroxyethyl)-ammonium vinyl sulfonate from (b) 74 parts of triethanolamine and (c) 61 parts of vinyl sulfonic acid methyl ester;

(a) 161 parts of

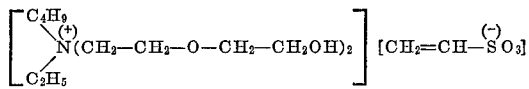

from (b) 110 parts

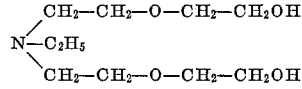

and (c) 82 parts of vinyl sulfonic acid butyl ester;

(a) 158 parts of

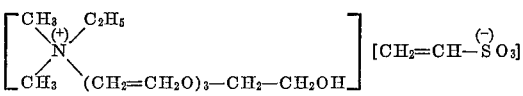

from (b) 110 parts of

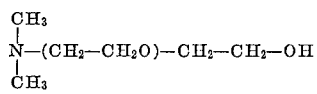

and (c) 68 parts of vinyl sulfonic acid ethyl ester;

(a) 188 parts of

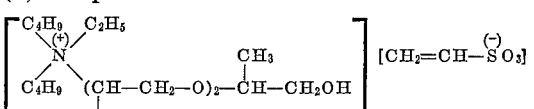

from (b) 151 parts of

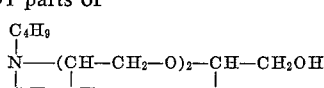

and (c) 68 parts of vinyl sulfonic acid ethyl ester; and (a) 102 parts of

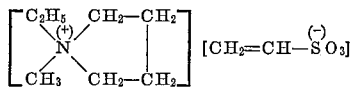

from (b) 42 parts of N-methylpyrrolidine and (c) 68 parts of vinyl sulfonic acid ethyl ester.

*Example A*

5 parts of trimethyl-phenyl-ammonium vinyl sulfonate and 0.5 part of potassium persulfate are dissolved in 150 parts of desalted water. The solution is heated to 80° C.

and 95 parts of n-butyl acrylate are allowed to flow in during the course of 30 minutes. The temperature is kept for another hour at 80° C. and then raised to 90° to 95° C. to remove the unreacted n-butyl acrylate. During this period, a weak current of nitrogen is led over the hot emulsion. After cooling, a 40% aqueous polymer dispersion is obtained from which transparent, slightly cloudy, sticky coatings may be prepared. The polymer dispersion is eminently suitable for the production of adhesive tapes and films because the coatings prepared therewith absorb water only to a small extent and moreover have good adhesion.

*Example B*

10 parts of trimethyl-cyclohexyl-ammonium vinyl sulfonate and 2.5 parts of potassium persulfate are dissolved in 500 parts of salt-free water. The solution is heated to 80° C. A mixture of 300 parts of vinyl acetate and 200 parts of n-butyl acrylate is added thereto in 45 minutes. The further working up is carried out as described in Example A. A 50% polymer dispersion is obtained which has only a slight tendency to foam.

*Example C*

15 parts of the quaternary ammonium salt prepared by reacting triethanolamine with vinyl sulfonic acid methyl ester are dissolved in 500 parts of distilled water. After adding 2 parts of potassium persulfate and 2 parts of sodium pyrophosphate, the solution is heated to 80° C. In the course of 30 minutes, a mixture of 400 parts of vinyl propionate and 100 parts of n-butyl acrylate is run in and the mixture then heated at 80° C. for an hour. During this time the unreacted constituents are removed by evaporation. The dispersion is suitable as a binding agent for interior and exterior finishes because films prepared therewith have only low water imbibition.

*Example D*

10 parts of the quaternary ammonium salt derived from vinyl sulfonic acid methyl ester and the reaction product of 1 mol of diethylamine with 4 mols of ethylene oxide are dissolved together with 2 parts of potassium persulfate and 2 parts of sodium pyrophosphate in 500 parts of salt-free water. The solution is heated to 80° C. and in the course of 15 minutes there are added first 100 parts of ethyl acrylate and then a mixture of 200 parts of ethyl acrylate and 200 parts of vinylidene chloride. After removal of the unreacted contsituents and cooling, a stable polymer dispersion is obtained from which films with low water imbibition can be prepared.

*Example E*

A mixture of 230 parts of ethyl acrylate and 20 parts of acrylic acid is added during the course of 2 hours while stirring to a solution, heated to 80° C., of 5 parts of the diethyl ammonium salt of vinyl sulfonic acid and 1 part of potassium persulfate in 250 parts of distilled water. The unreacted constituents are removed from the dispersion by heating for half an hour at 95° C. under a current of nitrogen. The dispersion cooled with continued stirring is especially stable to mechanical and thermal stresses and is eminently suitable for coating fibrous materials.

The foregoing examples explain the way in which the new compounds can be prepared and used. It will be obvious to the expert that the methods can be modified in many ways. For example in the neutralization process, other solvents, other concentrations, different temperatures and other working conditions may be used. The alkylation of amines with vinyl sulfonic acid esters is also capable of many modifications. Since neutralization and alkylation, including quaternization, are very generally applied methods, it will be obvious to the expert that any organic nitrogen base can be used for the production of the salts according to this invention and therefore can be contained in the salt in the form of a cation. In the examples, a great variety of amines and ammonium bases have been reacted. The expert will appreciate immediately that the invention is not limited to salts derived from these specific bases. He will on the contrary appreciate that all known nitrogen bases and even those which from time to time are newly prepared, will be suitable.

We claim:

A salt of the formula

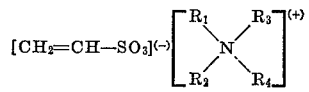

wherein $R_1$ represents alkyl with 1 to 4 carbon atoms; $R_2$ and $R_3$ represent a member of the class consisting of alkyl having 1 to 4 carbon atoms, a

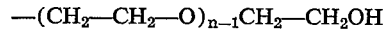

radical, wherein $n$ stands for an integer of from 1 to 4 inclusive, and the said radical wherein in each

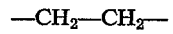

unit one hydrogen atom is replaced by methyl; $R_4$ represents a member of the class consisting of alkyl having 1 to 4 carbon atoms, monocyclic hydrocarbon with 5 to 12 carbon atoms, benzyl, a

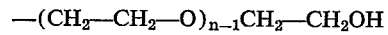

radical, wherein $n$ stands for an integer of from 1 to 4 inclusive, and the said radical wherein in each

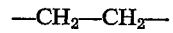

unit one hydrogen atom is replaced by methyl.

References Cited by the Examiner

UNITED STATES PATENTS

| | | | |
|---|---|---|---|
| 2,243,332 | 5/1941 | Simo et al. | 260—501 |
| 2,439,749 | 4/1948 | Niederl | 260—243 |
| 2,522,618 | 9/1950 | Johnson et al. | 260—674 |
| 2,715,142 | 8/1955 | Park | 260—2.1 |
| 2,742,472 | 4/1956 | Balzly et al. | 60—268 |
| 2,976,280 | 3/1961 | Hotelling | 260—239 |

OTHER REFERENCES

Kohler, Amer. Jour. Chemistry, vol. 20, 1898, pp. 683–84.

CHARLES B. PARKER, *Primary Examiner.*

IRVING MARCUS, WALTER A. MODANCE,
*Examiners.*